April 1, 1930.　　　　　F. N. LEE　　　　　1,752,441
CONVERTIBLE AUTO SEAT
Filed Aug. 6, 1928　　　2 Sheets-Sheet 2

F. N. Lee, Inventor
By C.A.Snow&Co.
Attorneys.

Patented Apr. 1, 1930

1,752,441

UNITED STATES PATENT OFFICE

FRANK N. LEE, OF DUPONT, GEORGIA

CONVERTIBLE AUTO SEAT

Application filed August 6, 1928. Serial No. 297,719.

This invention relates to a convertible automobile seat, and aims to provide novel means whereby the back and forward portion of an automobile seat may be moved in such a way as to provide a bed.

An important object of the invention is to provide means for causing the back of the front seat of an automobile to swing from its normal or upright position, to a horizontal position, when the pivoted front section of the seat is swung from a vertical to a horizontal position.

A still further object of the invention is to provide a seat of this character which may be readily and easily installed, the operating mechanism being such that it may be easily attached to motor vehicle construction now in common use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
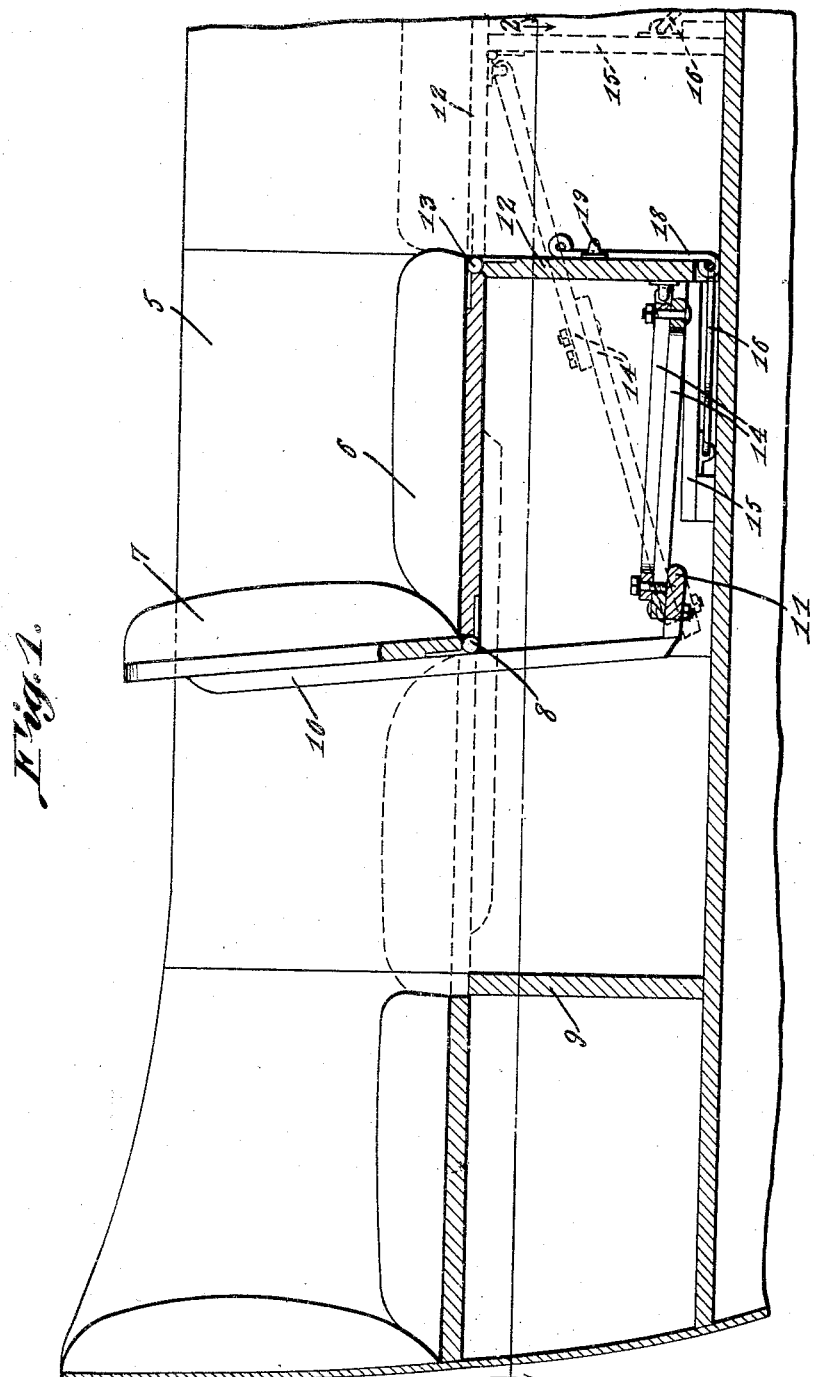
Figure 1 is a longitudinal sectional view through a motor vehicle body having a convertible seat, constructed in accordance with the invention.
Figure 2:
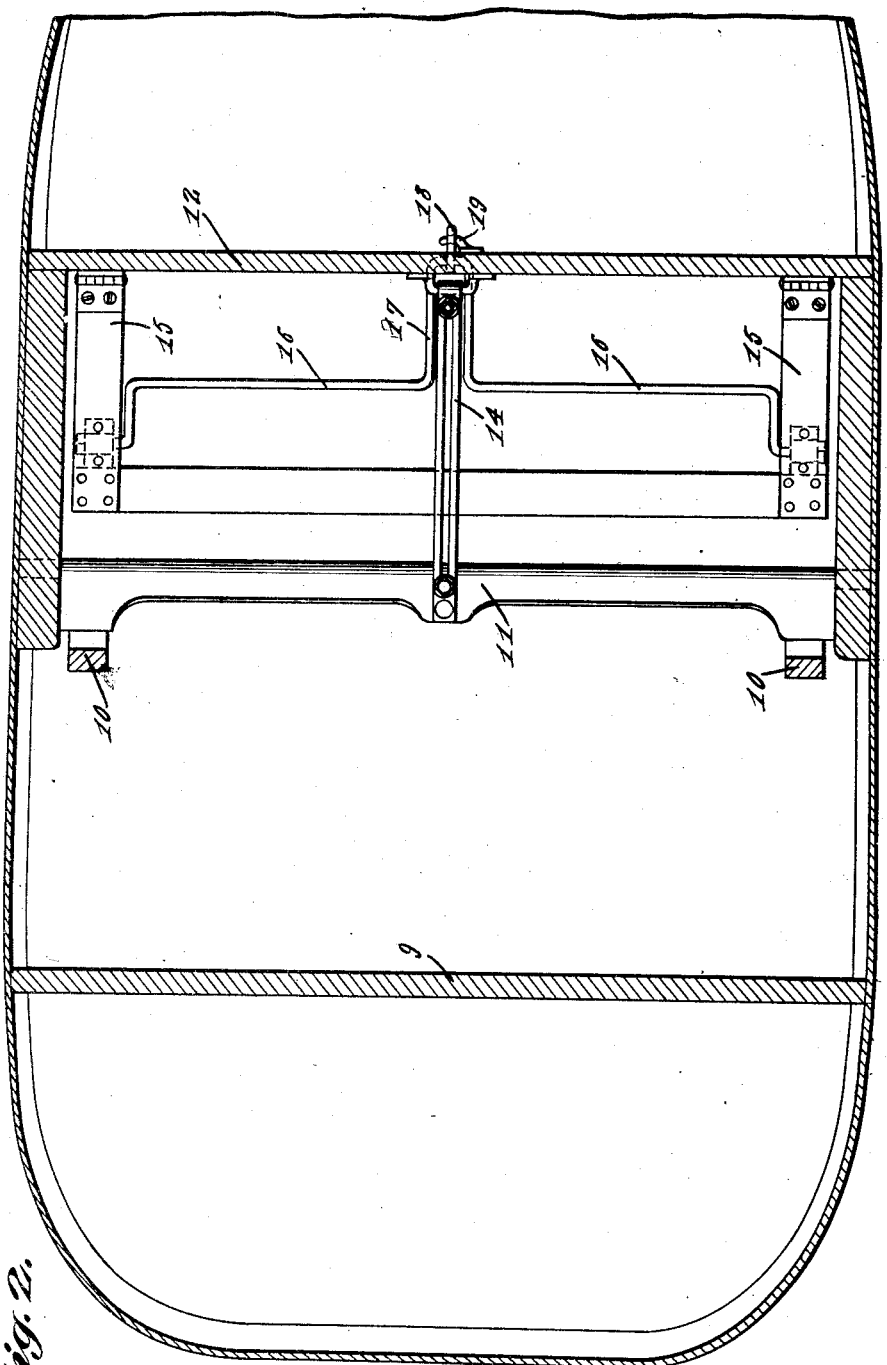
Figure 2 is a transverse sectional view through the body and seat.

Referring to the drawings in detail, the reference character 5 designates the body portion of the motor vehicle, and the reference character 6 designates the front seat thereof.

The back of the front seat is indicated by the reference character 7, and as shown is hingedly connected with the seat 6, at 8. The back 7 is of a width to extend across the space between the back of the front seat and the front of the back seat, the forward section 9 of the back seat having its upper edge extended beyond the front edge of the back cushion of the seat defining a shoulder to receive the back 7, when it is moved to a horizontal position.

Secured to the back 7, are bars 10 that extend downwardly where they engage the bar 11 which is pivotally supported under the front seat 6, so that the back 7 will be held in an upright position.

The reference character 12 designates the front section of the seat which is hingedly connected to the seat at 13, the same being connected with the bar 11, through the medium of the links 14 which are slidably connected, so that when the front section is moved outwardly to a position as shown in dotted lines in Figure 1 of the drawings, the bar 11 will tilt to allow the bars 10 to move past the bar 11 so that the back 7 of the seat may swing downwardly to its horizontal position.

Pivotally connected with the front section 12, are the supporting legs 15 to which the rod 16 is connected, the rod 16 having an offset portion 17 to which the operating rod 18 is connected. This rod is so constructed that it will swing upwardly in close engagement with the front section 12, where it will be held by the clasp 19 when the seat is in its natural position.

When it is desired to convert the seat into a bed, it is only necessary to move the operating rod 18 outwardly and pull the same forwardly, which movement results in the swinging of the forward section 12 outwardly, releasing the back 7.

From the foregoing it will be obvious that due to the construction shown and described, the seat may be readily and easily converted into a bed so that a motor vehicle equipped with a seat of this type will be especially adapted for touring.

It will also be obvious that the invention may be carried out with divided seats to the end that one seat may be converted into a bed, leaving the driver's seat in its upright or normal position.

I claim:

A vehicle seat comprising a seat section, a back section pivotally connected to the seat section, a front section pivotally connected to the seat section, bars secured to the back section and extending downwardly below the back section, a horizontal bar connecting the downwardly extended bars, pivoted leg members secured to the front section, a rod connecting the leg members, links connecting the horizontal bar and rod to move the leg members and back section simultaneously, and said leg members adapted to support the front section in a horizontal position.

In testimony that I claim the foregoing as my own, I have hereto affixed my signature.

FRANK N. LEE.